(12) United States Patent
Liao et al.

(10) Patent No.: US 11,662,599 B2
(45) Date of Patent: May 30, 2023

(54) ILLUMINATION SYSTEM AND PROJECTION DEVICE

(71) Applicant: Coretronic Corporation, Hsin-Chu (TW)

(72) Inventors: Chien-Chung Liao, Hsin-Chu (TW); Hung-Wei Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/227,398

(22) Filed: Apr. 12, 2021

(65) Prior Publication Data

US 2021/0373351 A1    Dec. 2, 2021

(30) Foreign Application Priority Data

May 29, 2020    (CN) .................. 202020943684.X

(51) Int. Cl.
*G02B 27/48*    (2006.01)
*G02B 5/02*    (2006.01)
*G03B 21/20*    (2006.01)

(52) U.S. Cl.
CPC .......... *G02B 27/48* (2013.01); *G02B 5/0278* (2013.01); *G03B 21/208* (2013.01); *G03B 21/2013* (2013.01); *G03B 21/2033* (2013.01)

(58) Field of Classification Search
CPC ............... G02B 27/48; G03B 21/2013; G03B 21/2033; G03B 21/208

USPC ........................................................ 353/94
See application file for complete search history.

(56) References Cited

U.S. PATENT DOCUMENTS 6,594,090 B2    7/2003    Kruschwitz et al.

FOREIGN PATENT DOCUMENTS

| CN | 106444246 A | * | 2/2017 | ............. G02B 27/48 |
| CN | 108398804 | | 8/2018 | |
| CN | 210142255 | | 3/2020 | |
| WO | WO-2018173200 A1 | * | 9/2018 | ......... G02B 27/0905 |
| WO | WO-2020253166 A1 | * | 12/2020 | ......... G03B 21/2013 |

* cited by examiner

*Primary Examiner* — Jerry L Brooks
(74) *Attorney, Agent, or Firm* — JCIPRNET

(57) ABSTRACT

The invention provides an illumination system and a projection device with the illumination system. The illumination system is configured to provide an illumination beam, and includes a coherent light source, a first and a second optical module, a first and a second diffuser element. A coherent beam emitted by the coherent light source is focused on a first position through the first optical module, and the first diffuser element is located at or near the first position. The coherent beam from the first diffuser element is focused on a second position through the second optical module. The second diffuser element is located on a transmission path of the coherent beam from the second optical module, and located at or near the second position. The coherent beam sequentially passes through the first diffuser element, the second optical module and the second diffuser element to form the illumination beam.

8 Claims, 7 Drawing Sheets

ILLUMINATION SYSTEM AND PROJECTION DEVICE

CROSS-REFERENCE TO RELATED APPLICATION

This application claims the priority benefit of China application serial no. 202020943684.X, filed on May 29, 2020. The entirety of the above-mentioned patent application is hereby incorporated by reference herein and made a part of this specification.

BACKGROUND OF THE INVENTION

1. Field of the Invention

The invention relates to an optical system and an optical device, particularly to an illumination system and a projection device.

2. Description of Related Art

Recently, projection devices based on solid-state light sources such as light-emitting diodes (LEDs), laser diodes and the like have gradually taken a place in the market. Among them, the laser diodes have become the mainstream light source of modern projectors due to the advantages of high collimation, strong energy, being convergent light sources and the like.

However, since a laser beam provided by the laser diode is a coherent beam which has high coherence, when the laser beam illuminates a rough object surface (for example, a lens, a reflector or the like), the unevenness of the object surface will allow the reflected or scattered light to form an optical path difference between each other, and thus a constructive or destructive interference phenomenon will be formed, thereby generating spotted laser speckles on an illuminated surface. This kind of laser speckles is an irregular noise-like pattern that has seemingly irregular bright and dark noise and will cause nonuniform brightness on the illuminated surface, which in turn causes degradation in the image quality of the projection device using this light source, thereby worsening the user's visual perception.

In order to alleviate the laser speckle phenomenon generated by the laser, a common way is to arrange a diffuser element at the position where optical paths are concentrated. However, if the diffusion degree (haze) or number of diffuser elements is increased in order to enhance the diffusing effect, the optical coupling efficiency may be reduced.

The information disclosed in this Background of the invention section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system, which can provide an illumination beam with good uniformity and have good optical efficiency.

The invention provides a projection device, which can provide a picture with good image quality and have good optical efficiency.

Other objectives and advantages of the invention may be more comprehensible from technical features disclosed in the invention.

In order to achieve one, part or all of the aforementioned objectives or other objectives, an embodiment of the invention provides an illumination system. The illumination system is configured to provide an illumination beam, and includes a coherent light source, a first optical module, a second optical module, a first diffuser element and a second diffuser element. The coherent light source is configured to emit a coherent beam. The first optical module is located on a transmission path of the coherent beam. The coherent beam is focused on a first position through the first optical module. The first diffuser element is located on the transmission path of the coherent beam, and located at the first position or near the first position. The second optical module is located on a transmission path of the coherent beam from the first diffuser element. The coherent beam is focused on a second position through the second optical module. The second diffuser element is located on a transmission path of the coherent beam from the second optical module, and located at the second position or near the second position. The coherent beam sequentially passes through the first diffuser element, the second optical module and the second diffuser element to form the illumination beam.

In order to achieve one, part or all of the aforementioned objectives or other objectives, an embodiment of the invention provides a projection device. The projection device includes the above illumination system, a light valve and a projection lens. The light valve is disposed on a transmission path of an illumination beam from the illumination system and configured to convert the illumination beam into an image beam. The projection lens is disposed on a transmission path of the image beam and configured to project the image beam out of the projection device.

Based on the above, the embodiments of the invention have at least one of the following advantages or effects. In the embodiments of the invention, the first diffuser element is located at or near the first position, the second diffuser element is located at or near the second position, and a haze of the second diffuser element is less than a haze of the first diffuser element, so that the illumination system and the projection device can effectively avoid the non-uniform intensity distribution and speckle phenomenon formed by the illumination beam. Thus, the illumination system can generate a light spot with relatively uniform brightness accordingly, so that the illumination beam formed later has good uniformity, the projection device can also provide a picture with good image quality, and both the illumination system and the projection device can have good optical efficiency.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
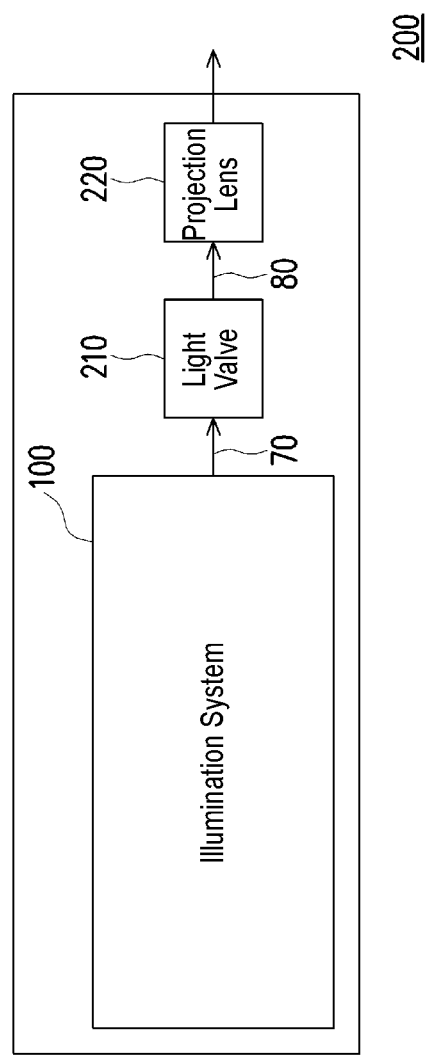
FIG. 1 is a schematic architecture diagram of a projection device according to an embodiment of the invention.

FIG. 1 is a schematic architecture diagram of a projection device according to an embodiment of the invention. FIG. 2 to FIG. 7 are schematic architecture diagrams of different illumination systems of FIG. 1. Referring to FIG. 1, in the embodiment, the projection device 200 includes an illumination system 100, a light valve 210 and a projection lens 220. The illumination system 100 is configured to provide an illumination beam 70. The light valve 210 is disposed on a transmission path of the illumination beam 70 from the illumination system 100 and configured to convert the illumination beam 70 into an image beam 80. The projection lens 220 is disposed on a transmission path of the image beam 80 and configured to project the image beam 80 out of the projection device 200 and onto a screen (not shown) to form an image picture.

After the illumination beam 70 converges on the light valve 210, the light valve 210 may sequentially transmit the image beam 80 of different colors formed by the illumination beam 70 to the projection lens 220. Therefore, the image picture can become a color picture.

For example, in the embodiment, the light valve 210 is, for example, a digital micro-mirror device (DMD), a liquid-crystal-on-silicon panel (LCOS panel) or other reflective light modulators. However, in other embodiments, the light valve 210 may also be a transparent liquid crystal panel, an electro-optical modulator, a maganeto-optic modulator, an acousto-optic modulator (AOM) or other penetrating light modulators.

The invention does not limit the number, form and type of the light valves 210. In the embodiment, the projection lens 220 is, for example, a combination including one or more optical lenses having diopter, and the optical lens includes, for example, a biconcave lens, a biconvex lens, a concave-convex lens, a convex-concave lens, a plano-convex lens, a plano-concave lens, and other non-planar lenses or various combinations thereof. The invention does not limit the form and type of the projection lens 220.

Figure 2:
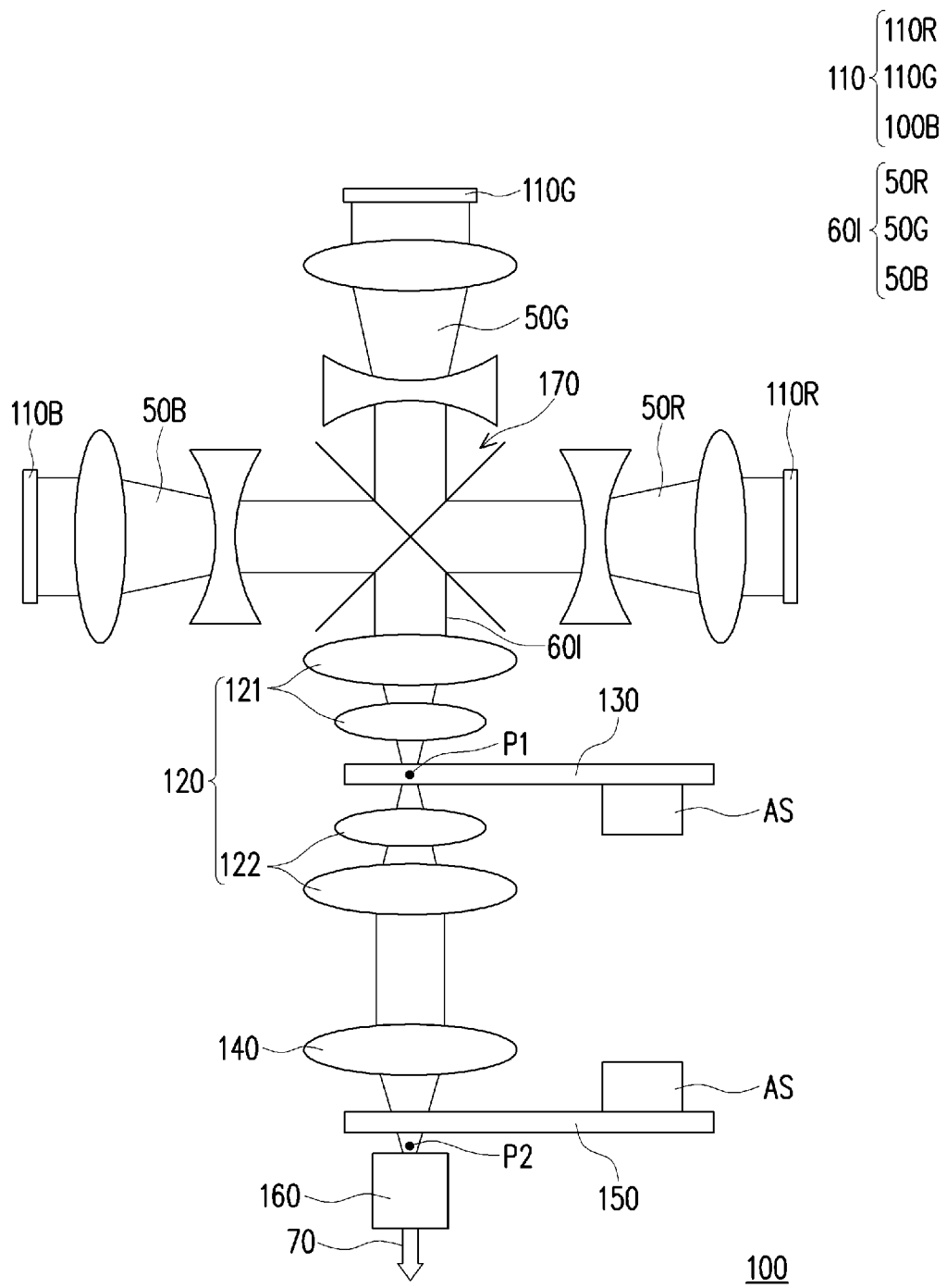
FIG. 2 to FIG. 7 are schematic architecture diagrams of different illumination systems of FIG. 1.

More specifically, as shown in FIG. 2, in the embodiment, the illumination system 100 includes a coherent light source 110, a first optical module 120, a first diffuser element 130, a second optical module 140, a second diffuser element 150 and a light homogenizing element 160. The coherent light source 110 is configured to emit a coherent beam 60I. The coherent light source 110 includes a first sub-coherent light source 110B, a second sub-coherent light source 110G and a third sub-coherent light source 110R that are respectively configured to emit a first sub-coherent beam 50B, a second sub-coherent beam 50G and a third sub-coherent beam 50R, and colors of the first sub-coherent beam 50B, the second sub-coherent beam 50G and the third sub-coherent beam 50R are different from each other. For example, in the embodiment, the first sub-coherent light source 110B, the second sub-coherent light source 110G and the third sub-coherent light source 110R of the coherent light source 110 are respectively a blue laser light source, a green laser light source and a red laser light source, and the first sub-coherent beam 50B, the second sub-coherent beam 50G and the third sub-coherent beam 50R included in the coherent beam 60I provided by the coherent light source 110 are respectively a blue laser beam, a green laser beam and a red laser beam, but the invention is not limited thereto.

As shown in FIG. 2, in the embodiment, the illumination system 100 further includes a light combining element 170, the light combining element 170 is located on transmission paths of the first sub-coherent beam 50B, the second sub-coherent beam 50G and the third sub-coherent beam 50R, the first sub-coherent beam 50B, the second sub-coherent beam 50G and the third sub-coherent beam 50R pass through the light combining element 170 and then travel in a same direction to form the coherent beam 60I, and the coherent beam 60I sequentially enters the first optical module 120 and the first diffuser element 130. In other words, as shown in FIG. 2, the first sub-coherent beam 50B, the second sub-coherent beam 50G and the third sub-coherent beam 50R enter the first diffuser element 130 from a same side of the first diffuser element 130.

More specifically, as shown in FIG. 2, in the embodiment, the first optical module 120 is located on a transmission path of the coherent beam 60I. The coherent beam 60I is focused on a first position P1 through the first optical module 120. Further, the first optical module 120 includes a first sub-optical module 121 and a second sub-optical module 122, and the first diffuser element 130 is located between the first sub-optical module 121 and the second sub-optical module 122. The first sub-optical module 121, the first diffuser element 130 and the second sub-optical module 122 are sequentially disposed on the transmission path of the coherent beam 60I. The coherent beam 60I is focused on the first position P1 through the first sub-optical module 121. For example, as shown in FIG. 2, in the embodiment, the first sub-optical module 121 may include at least one optical lens. In more detail, as shown in FIG. 2, in the embodiment, the coherent beam 60I is focused on an equivalent focal point through the first sub-optical module 121. That is, the equivalent focal point of the first sub-optical module 121 is the first position P1. Next, as shown in FIG. 2, the coherent beam 60I passes through the first position P1 and is then diffused and collimated through the second sub-optical module 122.

In more detail, as shown in FIG. 2, the first diffuser element 130 is located at the first position P1 or near the first position P1. It is worth noting that the meaning of "near" above refers to a predetermined distance before and after a certain position on the transmission path of the coherent beam 60I, but does not cross the positions of other optical lenses. In other words, there is no other optical lens between the first diffuser element 130 and the first position P1. For example, in the embodiment, a distance between the first diffuser element 130 and the first position P1 is less than 5 millimeters. Thus, since the first diffuser element 130 is located at the equivalent focal point of the first sub-optical module 121 (i.e., the first position P1) or near the equivalent focal point of the first sub-optical module 121 (i.e., the first position P1), the light spot diffused through the first diffuser element 130 is not too large and does not affect the light receiving efficiency of the subsequent light homogenizing element 160.

Next, as shown in FIG. 2, the coherent beam 60I passes through the first sub-optical module 121, the first diffuser element 130 and the second sub-optical module 122 and then sequentially enters the second optical module 140 and the second diffuser element 150. Specifically, as shown in FIG. 2, the second optical module 140 is located on a transmission path of the coherent beam 60I from the first diffuser element 130. The second optical module 140 is located between the first diffuser element 130 and the second diffuser element 150. The coherent beam 60I is focused on a second position P2 through the second optical module 140. For example, as shown in FIG. 2, in the embodiment, the second optical module 140 may include at least one optical lens. In more detail, as shown in FIG. 2, in the embodiment, the coherent beam 60I is focused on an equivalent focal point through the second optical module 140. That is, the equivalent focal point of the second optical module 140 is the second position P2.

The second diffuser element 150 and the light homogenizing element 160 are located on a transmission path of the coherent beam 60I from the second optical module 140, and located at the second position P2 or near the second position P2. It is worth noting that the meaning of "near" above also refers to a predetermined distance before and after a certain position on the transmission path of the coherent beam 60I, but does not cross the positions of other optical lenses. In other words, there is also no other optical lens between the second diffuser element 150 and the second position P2. For example, in the embodiment, a distance between the second diffuser element 150 and the second position P2 is less than 5 millimeters. Thus, since the second diffuser element 150 is located at the equivalent focal point of the second optical module 140 (i.e., the second position P2) or near the equivalent focal point of the second optical module 140 (i.e., the second position P2), the light spot diffused through the second diffuser element 150 is not too large and does not affect the light receiving efficiency of the subsequent light homogenizing element 160.

Further, as shown in FIG. 2, the second diffuser element 150 is also located between the light homogenizing element 160 and the second optical module 140, the light homogenizing element 160 is located on a transmission path of the coherent beam 60I from the second diffuser element 150, and an entrance of the light homogenizing element 160 is also located at the second position P2 or near the second position P2. For example, in the embodiment, a distance between the entrance of the light homogenizing element 160 and the second position P2 is also less than 5 millimeters. Moreover, the second position P2 is not limited to being located at, inside or outside the entrance of the light homogenizing element 160, as long as the light homogenizing element 160 can achieve a predetermined light homogenizing effect. In the embodiment, the light homogenizing element 160 is, for example, an integration rod, but the invention is not limited thereto. Thus, a light spot of the coherent beam 60I may be focused on the light homogenizing element 160 to form the illumination beam 70 after the coherent beam 60I sequentially passing through the first sub-optical module 121, the first diffuser element 130, the second sub-optical module 122, the second diffuser element 150 and the second optical module 140.

More specifically, in the embodiment, the first diffuser element 130 and the second diffuser element 150 are similar, and may respectively be a diffuser sheet, a diffuser wheel, an actuator or other optical elements with a light diffusion effect. In addition, the first diffuser element 130 and the second diffuser element 150 may also include an actuating mechanism AS, so that light receiving portions of the first diffuser element 130 and the second diffuser element 150 can be rotated or displaced. Specifically, a haze of the first diffuser element 130 and a haze of the second diffuser element 150 are different from each other. Thus, when the coherent beam 60I passes through the second diffuser element 150, a light diffusion effect is different from that of the first diffuser element 130, which can effectively avoid the speckle phenomenon.

However, the haze of the diffuser element will affect the optical efficiency and speckle performance of the illumination system 100. Therefore, when the haze of the diffuser element is large, a diffusion angle of the coherent beam 60I is large so that the optical efficiency is easily reduced, and when the haze of the diffuser element is small, the light diffusion efficiency of the coherent beam 60I is low so that the non-uniform intensity distribution and speckle phenomenon cannot be effectively avoided. As a result, in the embodiment, by disposing the first diffuser element 130 and the second diffuser element 150 at different positions, and by considering the light receiving efficiency of the relevant optical design, the haze of the second diffuser element 150 is enabled to be less than the haze of the first diffuser element 130, so that the illumination system 100 can effectively avoid the non-uniform intensity distribution and speckle phenomenon formed by the illumination beam 70 and have good optical efficiency.

More specifically, in the embodiment, since the first diffuser element 130 is located at or near the first position P1, only an angle at which the coherent beam 60I enters the first optical module 120 and the second optical module 140 is affected. However, since the first optical module 120 and the second optical module 140 function to guide the coherent beam 60I into the integration rod, and the first optical module 120 and the second optical module 140 can also receive light at a very large angle (±80 degrees or so), even if the first diffuser element 130 can be set to have a large haze, the light receiving efficiency of the first optical module 120 and the second optical module 140 will not be affected. For example, in the embodiment, the haze of the first diffuser element 130 is in a range of 3 degrees to 8 degrees.

On the other hand, since the second diffuser element 150 is located at or near the second position P2, the angle distribution of light entering the integration rod will be directly affected. Generally speaking, the angle of the beam that the light valve 210 and the lens can receive is fixed. If the angle exceeds the fixed value, the optical efficiency will be reduced. Therefore, the haze of the second diffuser element 150 has its upper limit. For example, in the embodiment, the range of the haze of the second diffuser element 150 may be set to a value less than the haze of the first diffuser element 130, for example, from 1 degree to 3 degrees, so that a better light receiving efficiency can be achieved.

In other words, in the embodiment, by locating the first diffuser element 130 at or near the first position P1, locating the second diffuser element 150 at or near the second position P2, and enabling the haze of the second diffuser element 150 to be less than the haze of the first diffuser element 130, the illumination system 100 can effectively avoid the non-uniform intensity distribution and speckle phenomenon formed by the illumination beam 70. Thus, the illumination system 100 can generate the light spot with relatively uniform brightness accordingly, so that the illumination beam 70 formed later has good uniformity, the projection device 200 can also provide the picture with good image quality, and both the illumination system 100 and the projection device 200 can have good optical efficiency.

Figure 3:
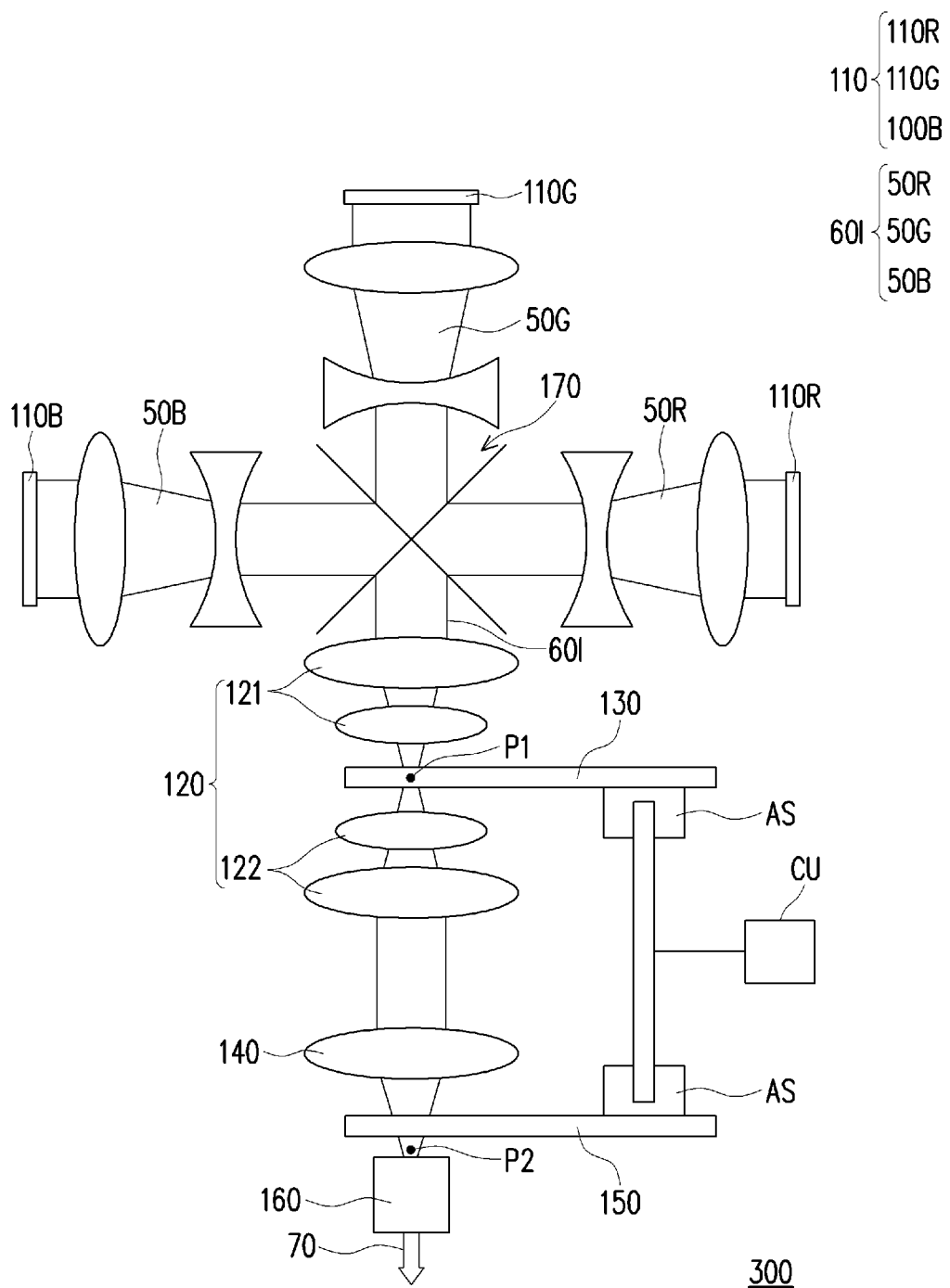

Referring to FIG. 3, the illumination system 300 of FIG. 3 is similar to the illumination system 100 of FIG. 2, and the differences are as follows. Specifically, as shown in FIG. 3, in the embodiment, the first diffuser element 130 and the second diffuser element 150 may be set to be axially connected or their motion mode may be controlled by a control unit CU in an electronic control manner. Thus, by disposing the first diffuser element 130 and the second diffuser element 150 to be axially connected, the motion modes of the first diffuser element 130 and the second diffuser element 150 may be set to be synchronous. For example, the first diffuser element 130 and the second diffuser element 150 may synchronously perform rotation, displacement, reverse rotation, reverse displacement and other motion manners having a specific relationship. In addition, the first diffuser element 130 and the second diffuser element 150 may also be set to move asynchronously by the actuating mechanism AS, and each of them moves in a manner to achieve a predetermined light diffusion effect.

Moreover, by locating the first diffuser element 130 at or near the first position P1, locating the second diffuser element 150 at or near the second position P2, and enabling the haze of the second diffuser element 150 to be less than the haze of the first diffuser element 130, the illumination system 300 can also effectively avoid the non-uniform intensity distribution and speckle phenomenon formed by the illumination beam 70. Thus, the illumination system 300 can generate the light spot with relatively uniform brightness accordingly, so that the illumination beam 70 formed later has good uniformity. Thereby, the illumination system 300 can achieve similar effects and advantages as the aforementioned illumination system 100, which will not be repeated here. Moreover, when the illumination system 300 is applied to the projection device 200 of FIG. 1, the projection device 200 can also achieve the aforementioned effects and advantages, which will not be repeated here.

Figure 4:
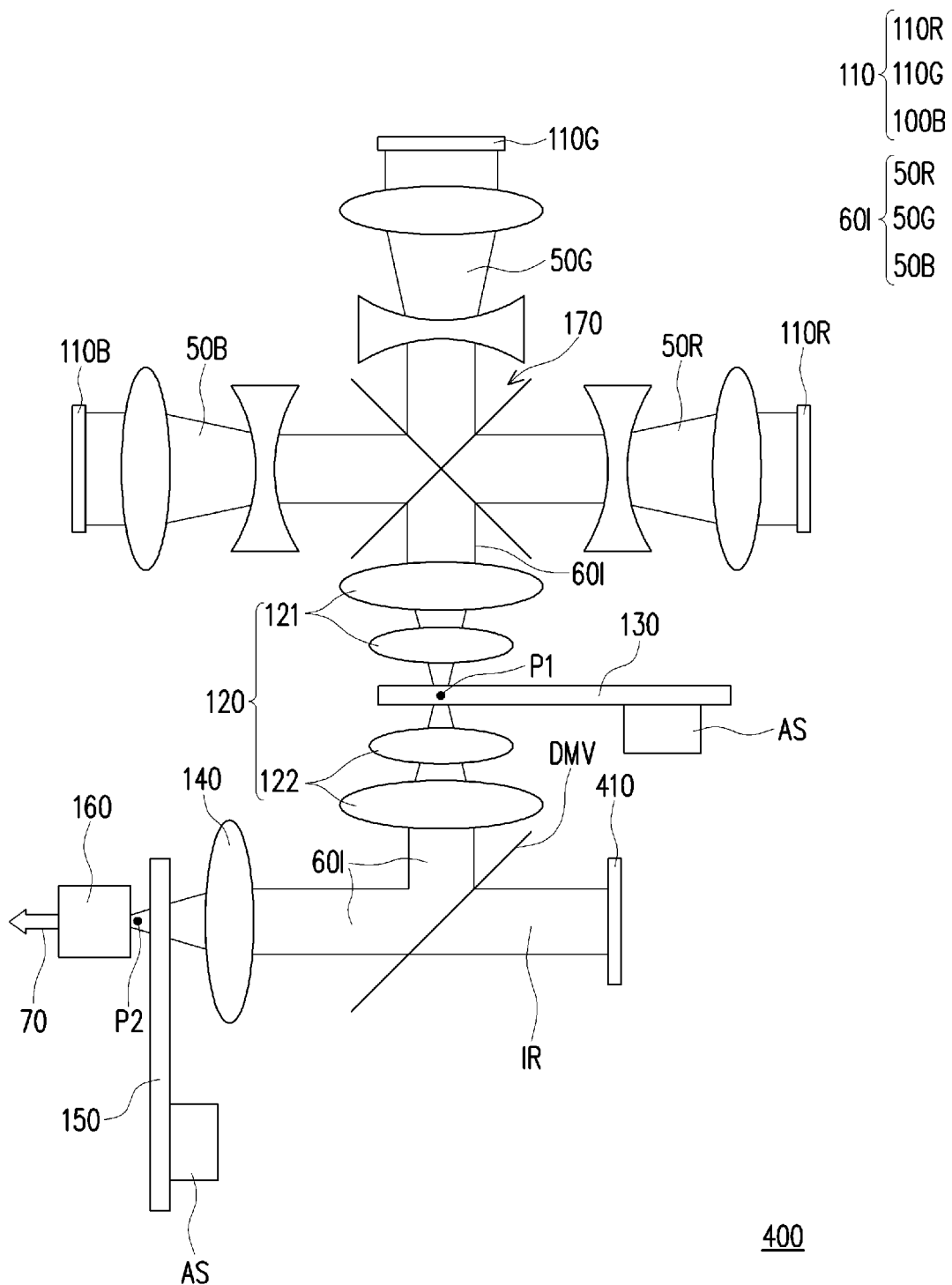

Referring to FIG. 4, the illumination system 400 of FIG. 4 is similar to the illumination system 100 of FIG. 2, and the differences are as follows. Specifically, as shown in FIG. 4, in the embodiment, the illumination system 400 further includes an invisible light source 410 configured to emit an invisible light beam IR. Moreover, as shown in FIG. 4, the illumination system 400 further includes a light splitting element DMV. The light splitting element DMV is located on transmission paths of the coherent beam 60I and the invisible light beam IR, and located between the first optical module 120 and the second optical module 140. For example, in the embodiment, the invisible light beam IR is, for example, an infrared light beam, and the light splitting element DMV may be a light splitter with a visible light reflection effect, which provides a reflection effect on visible light and allows invisible light to penetrate. That is, the light splitting element DMV can reflect the coherent beam 60I and allow the invisible light beam IR to penetrate.

In this way, as shown in FIG. 4, the illumination system 400 can simultaneously provide the illumination beam 70 with the visible light band and the invisible light band. Moreover, by locating the first diffuser element 130 at or near the first position P1, locating the second diffuser element 150 at or near the second position P2, and enabling the haze of the second diffuser element 150 to be less than the haze of the first diffuser element 130, the illumination system 400 can also effectively avoid the nonuniform intensity distribution and speckle phenomenon formed by the illumination beam 70. Thus, the illumination system 400 can generate the light spot with relatively uniform brightness accordingly, so that the illumination beam 70 formed later has good uniformity. Thereby, the illumination system 400 can achieve similar effects and advantages as the aforementioned illumination system 100, which will not be repeated here. Moreover, when the illumination system 400 is applied to the projection device 200 of FIG. 1, the projection device 200 can also achieve the aforementioned effects and advantages, which will not be repeated here.

In addition, it is worth noting that in the foregoing embodiments, although the illumination systems 100, 300, 400 are exemplified by the first sub-coherent beam 50B, the second sub-coherent beam 50G and the third sub-coherent beam 50R entering the first diffuser element 130 from the same side of the first diffuser element 130, the invention is not limited thereto. In other embodiments, the first sub-coherent beam 50B, the second sub-coherent beam 50G or the third sub-coherent beam 50R may also enter the first diffuser element 130 from different sides of the first diffuser element 130. This will be further described below.

Figure 5:
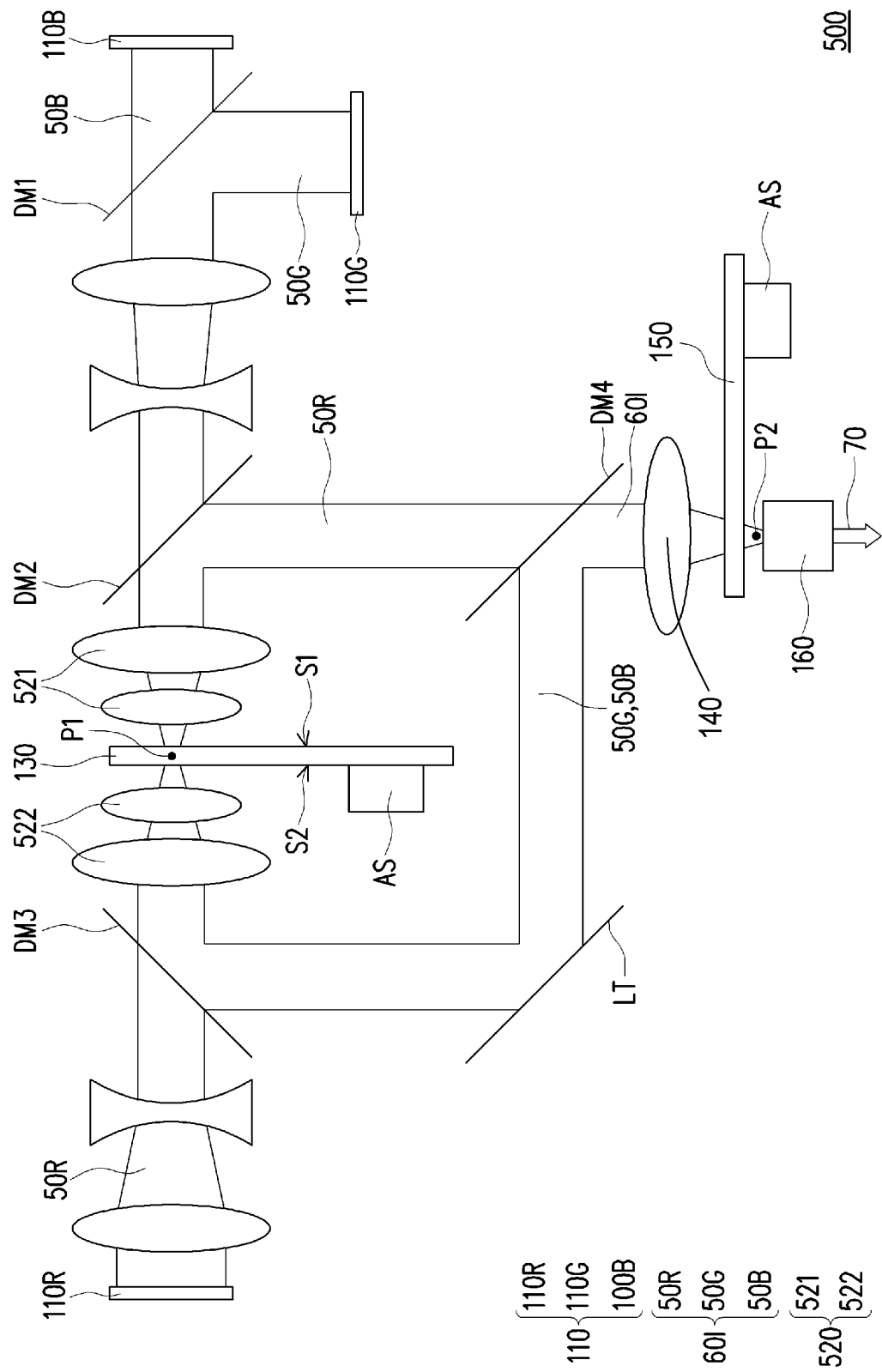

Referring to FIG. 5, the illumination system 500 of FIG. 5 is similar to the illumination system 100 of FIG. 2, and the differences are as follows. Specifically, as shown in FIG. 5, in the embodiment, the first diffuser element 130 has a first side S1 and a second side S2 opposite to each other. The first sub-coherent beam 50B and the second sub-coherent beam 50G enter the first diffuser element 130 from the first side S1, penetrate the first diffuser element 130 and then leave the first diffuser element 130 from the second side S2. The third sub-coherent beam 50R enters the first diffuser element 130 from the second side S2, penetrates the first diffuser element 130 and then leaves the first diffuser element 130 from the first side S1. In this way, since light can enter from both sides of the first diffuser element 130, the illumination system 500 can have more space therein for disposing the light source, thereby satisfying the requirement of higher brightness.

In addition, as shown in FIG. 5, in the embodiment, a first sub-optical module 521 of a first optical module 520 is located between both the first sub-coherent light source 110B and the second sub-coherent light source 110G and the first diffuser element 130, and the second sub-optical module 522 is located between the first diffuser element 130 and the third sub-coherent light source 110R. Further, as shown in FIG. 5, the first sub-optical module 521 and the second sub-optical module 522 are located on the transmission paths of the first sub-coherent beam 50B, the second sub-coherent beam 50G and the third sub-coherent beam 50R, the first sub-coherent beam 50B and the second sub-coherent beam 50G are focused on the first position P1 through the first sub-optical module 521, and the first sub-coherent beam 50B and the second sub-coherent beam 50G pass through the first position P1 and are then diffused and collimated through the second sub-optical module 522. The third sub-coherent beam 50R is focused on the first position P1 through the second sub-optical module 522, and the third sub-coherent beam 50R passes through the first position P1 and is then diffused and collimated through the first sub-optical module 521.

Moreover, the illumination system 100 further includes a plurality of optical elements, so that the first sub-coherent beam 50B, the second sub-coherent beam 50G and the third sub-coherent beam 50R can be transmitted on the above optical paths. For example, the plurality of optical elements include a first light splitter DM1, a second light splitter DM2, a third light splitter DM3, a light transmission element LT and a light combining element DM4.

Furthermore, in the embodiment, the first light splitter DM1 is located between both the first sub-coherent light source 110B and the second sub-coherent light source 110G and the first optical module 520. For example, the first light splitter DM1 may be a light splitter with a green light reflection effect, which provides a reflection effect on green light and allows blue light to penetrate. In this way, the first sub-coherent beam 50B may penetrate the first light splitter DM1 and be transmitted to the first optical module 520 and the first diffuser element 130, and the second sub-coherent beam 50G may also be reflected to the first optical module 520 and the first diffuser element 130 through the first light splitter DM1, but the invention is not limited thereto.

In addition, in the embodiment, the second light splitter DM2 is located between the first light splitter DM1 and the first sub-optical module 521, and the third light splitter DM3 is located between the third sub-coherent light source 110R and the second sub-optical module 522. Moreover, the second light splitter DM2 may be a light splitter with a red light reflection effect, which provides a reflection effect on red light and allows blue light and green light to penetrate, and the third light splitter DM3 may be a light splitter with a blue light and green light reflection effect, which provides a reflection effect on blue light and green light and allows red light to penetrate. The light transmission element LT is a reflection element, which can reflect beams of all bands.

In this way, as shown in FIG. 5, the first sub-coherent beam 50B and the second sub-coherent beam 50G may be combined through the first light splitter DM1, and then penetrate the second light splitter DM2 and be transmitted to the first diffuser element 130. Moreover, after the first sub-coherent beam 50B and the second sub-coherent beam 50G enter the first diffuser element 130 from the first side S1 and leave the first diffuser element 130 from the second side S2, the first sub-coherent beam 50B and the second sub-coherent beam 50G may be transmitted to the light combining element DM4 sequentially through the third light splitter DM3 and the light transmission element LT. On the other hand, the third sub-coherent beam 50R may penetrate the third light splitter DM3 and be transmitted to the first diffuser element 130. Moreover, after the third sub-coherent beam 50R enters the first diffuser element 130 from the second side S2 and leaves the first diffuser element 130 from the first side S1, the third sub-coherent beam 50R may be transmitted to the light combining element DM4 through the second light splitter DM2.

Furthermore, in the embodiment, the light combining element DM4 may be a light splitter with a blue light and green light reflection effect, which provides a reflection effect on blue light and green light and allows red light to penetrate. In this way, the third sub-coherent beam 50R may penetrate the light combining element DM4 and be transmitted to the second optical module 140 and the second diffuser element 150, and the first sub-coherent beam 50B and the second sub-coherent beam 50G may also be reflected to the second optical module 140 and the second diffuser element 150 through the light combining element DM4. In this way, after the first sub-coherent beam 50B, the second sub-coherent beam 50G and the third sub-coherent beam 50R are combined through the light combining element DM4 and then travel in the same direction to form the coherent beam 60I, the coherent beam sequentially enters the second optical module 140 and the second diffuser element 150. Moreover, the coherent beam 60I may be focused on the light homogenizing element 160 and form the illumination beam 70 after passing through the second optical module 140 and the second diffuser element 150.

In this way, as shown in FIG. 5, in the embodiment, by disposing the second light splitter DM2 and the third light splitter DM3, only the first sub-coherent beam 50B and the second sub-coherent beam 50G will pass through the optical lens located between the first light splitter DM1 and the second light splitter DM2, and only the third sub-coherent beam 50R will pass through the optical lens located between the third sub-coherent light source 110R and the third light splitter DM3. In other words, both the first sub-coherent beam 50B and the second sub-coherent beam 50G and the third sub-coherent beam 50R can respectively pass through the optical lenses of the different optical modules, and be sequentially focused on the first position P1 and transmitted to the subsequent light homogenizing element 160. Moreover, generally speaking, the number of light-emitting elements of the third sub-coherent light source 110R as the red laser light source is greater than the number of light-emitting elements of the first sub-coherent light source 110B as the blue laser light source or the number of light-emitting elements of the second sub-coherent light source 110G as the green laser light source, so a divergence angle of the third sub-coherent beam 50R is different from divergence angles of the first sub-coherent beam 50B and the second sub-coherent beam 50G correspondingly. Therefore, the illumination system 100 can adjust the size of the light spot according to the sub-coherent beams of different colors by designing curvatures of the different optical lenses above, so that the angle of the light entering the light homogenizing element 160 is uniform, thereby improving the light receiving efficiency.

On the other hand, in the embodiment, by locating the first diffuser element 130 at or near the first position P1, locating the second diffuser element 150 at or near the second position P2, and enabling the haze of the second diffuser element 150 to be less than the haze of the first diffuser element 130, so that the illumination system 500 can also effectively avoid the nonuniform intensity distribution and speckle phenomenon formed by the illumination beam 70. Thus, the illumination system 500 can generate the light spot with relatively uniform brightness accordingly, so that the illumination beam 70 formed later has good uniformity. Thereby, the illumination system 500 can achieve similar effects and advantages as the aforementioned illumination system 100, which will not be repeated here. Moreover, when the illumination system 500 is applied to the projection device 200 of FIG. 1, the projection device 200 can also achieve the aforementioned effects and advantages, which will not be repeated here.

In addition, it is worth noting that in the foregoing embodiment, although the light combining element DM4 of the illumination system 500 is exemplified by the light splitter with the blue light and green light reflection effect, the invention is not limited thereto. In other embodiments, the light combining element DM4 or other light splitter or light splitting element with a light splitting characteristic may also have different light splitting characteristics depending on optical requirements. This will be further described below.

Figure 6:
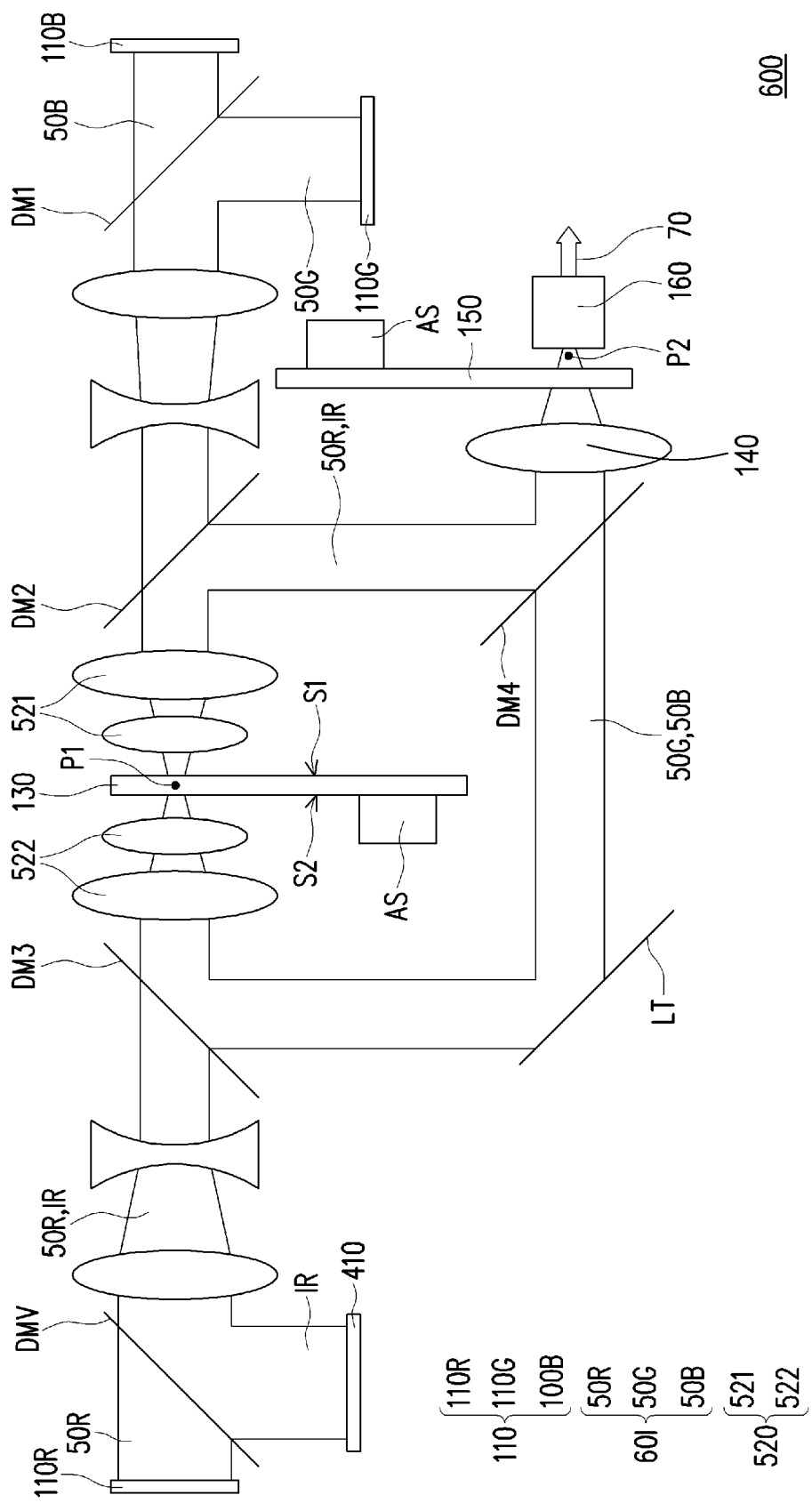

Referring to FIG. 6, the illumination system 600 of FIG. 6 is similar to the illumination system 500 of FIG. 5, and the differences are as follows. Specifically, as shown in FIG. 6, in the embodiment, the illumination system 600 further includes an invisible light source 410 configured to emit an invisible light beam IR. Moreover, as shown in FIG. 6, the illumination system 600 further includes a light splitting element DMV. The light splitting element DMV is located on transmission paths of the third sub-coherent beam 50R and the invisible light beam IR, and located between the third sub-coherent light source 110R and the first optical module 520. For example, in the embodiment, the invisible light beam IR is, for example, an infrared light beam, and the light splitting element DMV may be a light splitter with an invisible light reflection effect, which provides a reflection effect on invisible light and allows visible light to penetrate.

In this way, as shown in FIG. 6, the invisible light beam IR may be combined with the third sub-coherent beam 50R through the light splitting element DMV, and transmitted to the light combining element DM4 through the same transmission path as the third sub-coherent beam 50R. Furthermore, in the embodiment, in order to enable the invisible light beam IR to be transmitted on the above optical path, the third light splitter DM3 not only provides a reflection effect on blue light and green light and allows red light to penetrate, but also allows the invisible light beam IR to penetrate, and the second light splitter DM2 not only provides a reflection effect on red light and allows blue light and green light to penetrate, but also provides a reflection effect on the invisible light beam IR. In this way, as shown in FIG. 6, all the first sub-coherent beam 50B, the second sub-coherent beam 50G, the third sub-coherent beam 50R and the invisible light beam IR can be transmitted to the light combining element DM4.

In addition, as shown in FIG. 6, relative positions of the second optical module 140 and the second diffuser element 150 to the light combining element DM4 are different from relative positions of the second optical module 140 and the second diffuser element 150 to the light combining element DM4 of FIG. 5, so in the embodiment, the light combining element DM4 may be a light splitter with a red light and invisible light reflection effect, which provides a reflection effect on red light and invisible light and allows blue light and green light to penetrate. In this way, the third sub-coherent beam 50R and the invisible light beam IR may be reflected to the second optical module 140 and the second diffuser element 150 through the light combining element DM4, and the first sub-coherent beam 50B and the second sub-coherent beam 50G may also penetrate the light combining element DM4 and be transmitted to the second optical module 140 and the second diffuser element 150.

In this way, as shown in FIG. 6, the illumination system 600 can simultaneously provide the illumination beam 70 with the visible light band and the invisible light band. Moreover, by locating the first diffuser element 130 at or near the first position P1, locating the second diffuser element 150 at or near the second position P2, and enabling the haze of the second diffuser element 150 to be less than the haze of the first diffuser element 130, the illumination system 600 can also effectively avoid the non-uniform intensity distribution and speckle phenomenon formed by the illumination beam 70. Thus, the illumination system 600 can generate the light spot with relatively uniform brightness accordingly, so that the illumination beam 70 formed later has good uniformity. Thereby, the illumination system 600 can achieve similar effects and advantages as the aforementioned illumination system 500, which will not be repeated here. Moreover, when the illumination system 600 is applied to the projection device 200 of FIG. 1, the projection device 200 can also achieve the aforementioned effects and advantages, which will not be repeated here.

In addition, it is worth noting that in the foregoing embodiments, although the transmission paths of the first sub-coherent beam 50B, the second sub-coherent beam 50G and the third sub-coherent beam 50R of the illumination systems 100, 300, 400, 500, 600 are exemplified by passing through the optical paths of the first optical module 120, the first diffuser element 130, the second optical module 140 and the second diffuser element 150, the invention is not limited thereto. In other embodiments, not all the sub-coherent beams will pass through the above optical paths, which will be further described below.

Figure 7:
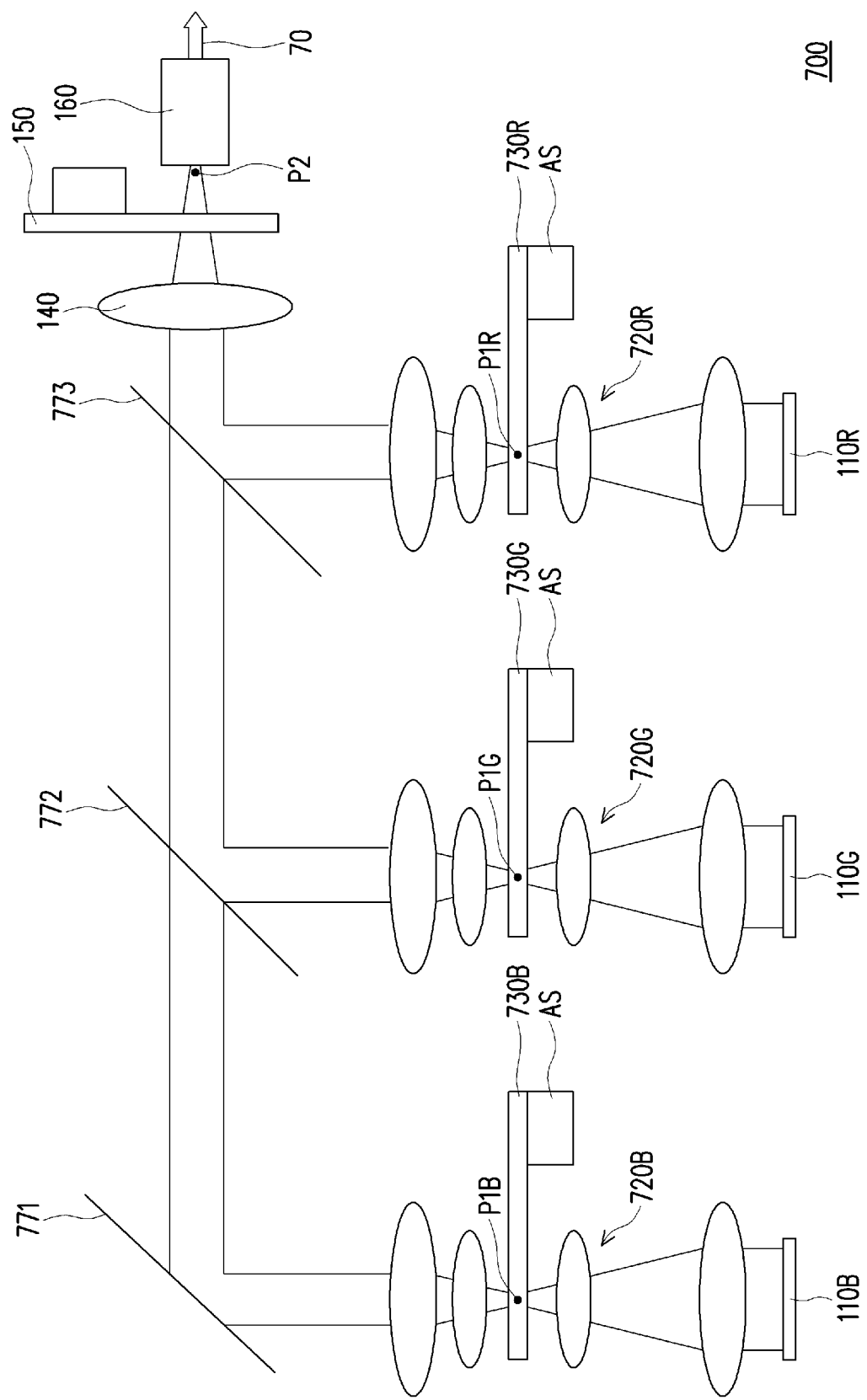

Referring to FIG. 7, the illumination system 700 of FIG. 7 is similar to the illumination system 100 of FIG. 1, and the differences are as follows. Specifically, as shown in FIG. 7, in the embodiment, first diffuser elements 730B, 730G, 730R and first optical modules 720B, 720G, 720R may be selectively disposed between at least one sub-coherent light source and the second optical module 140. Specifically, in the embodiment, the number of the first diffuser elements 730B, 730G, 730R and the first optical modules 720B, 720G, 720R is three, and each of the first diffuser elements 730B, 730G, 730R and each of the first optical modules 720B, 720G, 720R are respectively disposed between the first sub-coherent light source 110B, the second sub-coherent light source 110G, the third sub-coherent light source 110R and the second optical module 140 correspondingly, but the invention is not limited thereto. In other embodiments, the number of the first diffuser elements 730B, 730G, 730R and the first optical modules 720B, 720G, 720R may also be less than three, and they are selectively disposed between part of the sub-coherent light sources and the second optical module 140.

In this way, as shown in FIG. 7, the first sub-coherent beam 50B, the second sub-coherent beam 50G and the third sub-coherent beam 50R may respectively pass through the respective separate first diffuser elements 730B, 730G, 730R and the first optical modules 720B, 720G, 720R. Therefore, the illumination system 700 can adjust the size of the light spot according to the sub-coherent beams of different colors by designing curvatures of the optical lenses of the first optical modules 720B, 720G, 720R, so that the light receiving angle of the light entering the light homogenizing element 160 is uniform, thereby improving the light receiving efficiency.

Moreover, as shown in FIG. 7, the first sub-coherent beam 50B penetrating the first diffuser element 730B, the second sub-coherent beam 50G penetrating the first diffuser element 730G and the third sub-coherent beam 50R penetrating the first diffuser element 730R are respectively reflected through a light combining element 771, a light combining element 772 and a light combining element 773 and then travel in a same direction to form the coherent beam 60I, and the coherent beam sequentially enters the second optical module 140 and the second diffuser element 150. Furthermore, in the embodiment, the light combining element 771 may be any optical element configured to reflect blue light, such as a light splitter or a reflection element with a blue light reflection effect. The light combining element 772 may be a light splitter that has a green light reflection effect and allows blue light to penetrate. The light combining element 773 may be a light splitter that has a red light reflection effect and allows blue light and green light to penetrate. In this way, as shown in FIG. 7, the first sub-coherent beam 50B can be reflected by the light combining element 771, and then sequentially penetrate the light combining element 772 and the light combining element 773 and be transmitted to the second optical module 140. The second sub-coherent beam 50G is reflected through the light combining element 772, and then penetrates the light combining element 773 and is transmitted to the second optical module 140. The third sub-coherent beam 50R is reflected through the light combining element 773 and then transmitted to the second optical module 140. The coherent beam 60I formed by the first sub-coherent beam 50B, the second sub-coherent beam 50G and the third sub-coherent beam 50R may be focused on or near the second diffuser element 150 through the second optical module 140.

That is, in the embodiment, by disposing the first diffuser elements 730B, 730G, 730R at or near first positions P1B, P1G, P1R of the first optical modules 720B, 720G, 720R correspondingly, disposing the second diffuser element 150 is disposed at or near a second position P2, and enabling a haze of the second diffuser element 150 to be less than a haze of the first diffuser element 730B, 730G, 730R, the illumination system 700 can also effectively avoid the non-uniform intensity distribution and speckle phenomenon formed by the illumination beam 70. Thus, the illumination system 700 can generate the light spot with relatively uniform brightness accordingly, so that the illumination beam 70 formed later has good uniformity. Thereby, the illumination system 700 can achieve similar effects and advantages as the aforementioned illumination system 100, which will not be repeated here. Moreover, when the illumination system 700 is applied to the projection device 200 of FIG. 1, the projection device 200 can also achieve the aforementioned effects and advantages, which will not be repeated here.

Based on the above, the embodiments of the invention have at least one of the following advantages or effects. In the embodiments of the invention, by locating the first diffuser element at or near the first position, locating the second diffuser element at or near the second position, and enabling the haze of the second diffuser element to be less than the haze of the first diffuser element, the illumination system and the projection device can effectively avoid the non-uniform intensity distribution and speckle phenomenon formed by the illumination beam. Thus, the illumination system can generate the light spot with relatively uniform brightness accordingly, so that the illumination beam formed later has good uniformity, the projection device can also provide the picture with good image quality, and both the illumination system and the projection device can have good optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination beam, comprising:
   a coherent light source, configured to emit a coherent beam;
   a first optical module, located on a transmission path of the coherent beam, wherein the coherent beam is focused on a first position through the first optical module;
   a first diffuser element, located on the transmission path of the coherent beam, and located at the first position or near the first position;
   a second optical module, located on a transmission path of the coherent beam from the first diffuser element, wherein the coherent beam is focused on a second position through the second optical module; and
   a second diffuser element, located on a transmission path of the coherent beam from the second optical module, and located at the second position or near the second position, wherein the coherent beam sequentially passes through the first diffuser element, the second optical module and the second diffuser element to form the illumination beam, wherein the coherent light source comprises a first sub-coherent light source, a second sub-coherent light source and a third sub-coherent light source that are respectively configured to emit a first sub-coherent beam, a second sub-coherent beam and a third sub-coherent beam, and the illumination system further comprises a light combining element located on transmission paths of the first sub-coherent beam, the second sub-coherent beam and the third sub-coherent beam, and the first sub-coherent beam, the second sub-coherent beam and the third sub-coherent beam are combined through the light combining element and then travel in a same direction, the first diffuser element has a first side and a second side opposite to each other, the first sub-coherent beam and the second sub-coherent beam enter the first diffuser element from the first side and leave the first diffuser element from the second side, and the third sub-coherent beam enters the first diffuser element from the second side and leaves the first diffuser element from the first side.

2. The illumination system according to claim 1, wherein the first optical module comprises a first sub-optical module and a second sub-optical module, the first diffuser element is located between the first sub-optical module and the second sub-optical module, the first sub-optical module is located between both the first sub-coherent light source and the second sub-coherent light source and the first diffuser element, and the second sub-optical module is located between the first diffuser element and the third sub-coherent light source.

3. The illumination system according to claim 2, wherein the first sub-optical module and the second sub-optical module are located on the transmission paths of the first sub-coherent beam, the second sub-coherent beam and the third sub-coherent beam, wherein the first sub-coherent beam and the second sub-coherent beam are focused on the first position through the first sub-optical module, the first sub-coherent beam and the second sub-coherent beam pass through the first position and are then diffused and collimated through the second sub-optical module, the third sub-coherent beam is focused on the first position through the second sub-optical module, and the third sub-coherent beam passes through the first position and is then diffused and collimated through the first sub-optical module.

4. The illumination system according to claim 1, wherein the first sub-coherent beam, the second sub-coherent beam and the third sub-coherent beam are combined through the light combining element and then travel in the same direction and sequentially enters the second optical module and the second diffuser element.

5. A projection device, comprising:
an illumination system, configured to provide an illumination beam, and comprising:
a coherent light source, configured to emit a coherent beam;
a first optical module, located on a transmission path of the coherent beam, wherein the coherent beam is focused on a first position through the first optical module;
a first diffuser element, located on the transmission path of the coherent beam, and located at the first position or near the first position;
a second optical module, located on a transmission path of the coherent beam from the first diffuser element, wherein the coherent beam is focused on a second position through the second optical module; and
a second diffuser element, located on a transmission path of the coherent beam from the second optical module, and located at the second position or near the second position, wherein the coherent beam sequentially passes through the first diffuser element, the second optical module and the second diffuser element to form the illumination beam;
a light valve, disposed on a transmission path of the illumination beam from the illumination system and configured to convert the illumination beam into an image beam; and
a projection lens, disposed on a transmission path of the image beam and configured to project the image beam out of the projection device,
wherein the coherent light source comprises a first sub-coherent light source, a second sub-coherent light source and a third sub-coherent light source that are respectively configured to emit a first sub-coherent beam, a second sub-coherent beam and a third sub-coherent beam, and the illumination system further comprises a light combining element located on transmission paths of the first sub-coherent beam, the second sub-coherent beam and the third sub-coherent beam, and the first sub-coherent beam, the second sub-coherent beam and the third sub-coherent beam are combined through the light combining element and then travel in a same direction, the first diffuser element has a first side and a second side opposite to each other, the first sub-coherent beam and the second sub-coherent beam enter the first diffuser element from the first side and leave the first diffuser element from the second side, and the third sub-coherent beam enters the first diffuser element from the second side and leaves the first diffuser element from the first side.

6. The projection device according to claim 5, wherein the first optical module comprises a first sub-optical module and a second sub-optical module, the first diffuser element is located between the first sub-optical module and the second sub-optical module, the first sub-optical module is located between both the first sub-coherent light source and the second sub-coherent light source and the first diffuser element, and the second sub-optical module is located between the first diffuser element and the third sub-coherent light source.

7. The projection device according to claim 6, wherein the first sub-optical module and the second sub-optical module are located on the transmission paths of the first sub-coherent beam, the second sub-coherent beam and the third sub-coherent beam, wherein the first sub-coherent beam and the second sub-coherent beam are focused on the first position through the first sub-optical module, the first sub-coherent beam and the second sub-coherent beam pass through the first position and are then diffused and collimated through the second sub-optical module, the third sub-coherent beam is focused on the first position through the second sub-optical module, and the third sub-coherent beam passes through the first position and is then diffused and collimated through the first sub-optical module.

8. The projection device according to claim 5, wherein the first sub-coherent beam, the second sub-coherent beam and the third sub-coherent beam are combined through the light combining element and then travel in the same direction to form the coherent beam, the coherent beam sequentially enters the second optical module and the second diffuser element.

* * * * *